(12) United States Patent
Giusti

(10) Patent No.: US 8,719,388 B2
(45) Date of Patent: May 6, 2014

(54) METHOD FOR INSTALLING A WEB PACKAGE WITHIN A MANUFACTURING EXECUTING SYSTEM

(75) Inventor: Nadia Giusti, Chiavari (IT)

(73) Assignee: Siemens Aktiengesellschaft, Munich (DE)

( * ) Notice: Subject to any disclaimer, the term of this patent is extended or adjusted under 35 U.S.C. 154(b) by 366 days.

(21) Appl. No.: 12/700,791

(22) Filed: Feb. 5, 2010

(65) Prior Publication Data

US 2010/0250568 A1 Sep. 30, 2010

(30) Foreign Application Priority Data

Mar. 27, 2009 (EP) .................................... 09156475

(51) Int. Cl.
*G06F 15/16* (2006.01)
(52) U.S. Cl.
USPC ...................................................... 709/222
(58) Field of Classification Search
None
See application file for complete search history.

(56) References Cited

U.S. PATENT DOCUMENTS

| 5,995,730 | A | * | 11/1999 | Blinne .......................... 716/103 |
|---|---|---|---|---|
| 6,490,592 | B1 | | 12/2002 | St. Denis et al. |
| 7,577,723 | B2 | | 8/2009 | Matsuda et al. |
| 7,613,796 | B2 | | 11/2009 | Harvey et al. |
| 2008/0126521 | A1 | | 5/2008 | Hanes |
| 2008/0133564 | A1 | | 6/2008 | Gandolph et al. |

FOREIGN PATENT DOCUMENTS

| EP | 1 001 584 A2 | 5/2000 |
|---|---|---|
| EP | 1 113 372 A2 | 7/2001 |
| EP | 1 398 924 A2 | 3/2004 |
| WO | 02/37273 A2 | 5/2002 |
| WO | 2006/051037 A1 | 5/2006 |
| WO | 2008/036403 A2 | 3/2008 |

OTHER PUBLICATIONS

Extended European Search Report, dated Aug. 3, 2009.

* cited by examiner

*Primary Examiner* — Scott Christensen
(74) *Attorney, Agent, or Firm* — Laurence A. Greenberg; Werner H. Stemer; Ralph E. Locher

(57) ABSTRACT

A method enables the administration of resources (content) in web packages. By automatically adding a prefix to the resource name causing a name conflict, even resources having the same name can be handled when installing a new web package by the virtual file system mapping the resources to which a prefix has been added to the physical content required for the web application.

6 Claims, 2 Drawing Sheets

METHOD FOR INSTALLING A WEB PACKAGE WITHIN A MANUFACTURING EXECUTING SYSTEM

CROSS-REFERENCE TO RELATED APPLICATION

This application claims the priority, under 35 U.S.C. §119, of European application EP 09156475.7, filed Mar. 27, 2009; the prior application is herewith incorporated by reference in its entirety.

BACKGROUND OF THE INVENTION

Field of the Invention

The present invention relates to a method for installing a web package within a manufacturing executing system (MES), wherein the web package contains web application resources.

As it is well known, a method for scheduling manufacturing processes planned by an enterprise resource planning (ERP) and produced by a shop floor, provides a manufacturing executing system (MES) for scheduling and implementing the scheduled manufacturing processes and controlling the corresponding production steps at the plant floor.

In particular, the enterprise resource planning (ERP) is a system including hardware devices and corresponding software applications for planning the business resources of an enterprise, i.e. material provisions, human resource managements, purchasing, orders, profits, finance, inventory controls, customer management, etcetera, while the term "shop floor" has been used to indicate a system supporting the control of single machines involved in the manufacturing processes, for example by measuring the number of pieces produced per hour by each machine or the functioning parameters thereof, the quality of the pieces produced and so on.

MES is an intermediate layer providing computing machines and software tools between the ERP upper layer and the shop floor lower layer, including a software tool for production order management, which receives requests of production from the ERP, and a software tool for production modeling, which supports the phases of selecting and managing the resources to be involved in the manufacturing processes, i.e. employees, machines and materials, in order to realize a planned manufacturing process within required time constrains.

Therefore, manufacturing execution systems require modeling plant equipment for both scheduling and controlling activities. More particular, the manufacturing execution systems require reliable instruments in order to exchange web applications over the distributed multi-client architecture which is usually present in an ordinary manufacturing environment.

Typically, a web package is a compressed file that contains web application contents in the form of web pages, user controls, scripts, class library, images, layout information and any further element referring to an ASP.NET web application. With the use of the web package it is possible to create a compressed, encrypted and self-descriptive web package. Further, the deployment of its content by an administrative console can be regulated and the entire integration of its contents inside a web application can be controlled.

A web package usually contains a multitude of functionalities and can have a dependency on other web packages. During the engineering phase a web administrator is to decide which web packages have to be installed according to customer needs. A specialized application displays the dynamic content of the web package. These contents are closed into the web package and virtually provided by the web application.

The fundamental technical requirements for web package in a manufacturing execution environment include the following:

a) the web package should be in a closed format;
b) its authenticity must be guaranteed entirely; and
c) the content of the web package must be provided by a web application.

These implications require that the web package content must be encrypted, and in order to ensure that the content cannot be modified by adding, deleting or altering its content (pages, controls . . . ), the web package must be hashed too.

So far, the use of the content of the web package is enabled by a web content that is present on the file system. Unfortunately, it is not possible to distribute web contents when still encrypted and to select which of the content shall be shown or not.

Therefore, the web package is provided within a manufacturing executing system (MES), by the steps of:
a) generating the web package by:
  i) sorting the web application content according to a predefined structure;
  ii) compressing the sorted web application content into a first compressed file, such as a first zip-file;
  iii) concatenating the content of the first compressed file with a digital signature;
  iv) compressing the signed content into a second compressed file, such as a second zip-file; and
  v) encrypting the second compressed file;
b) forwarding the generated web package for download to other users connected to the manufacturing execution system.

This method thus enables the provider of the manufacturing execution system to broadcast web packages over the network and enabling each trusted user to open the web package and specify the content of web package to be either applied on the user environment and/or to be shown within the user's environment. The main goal is therefore to create a web package having in unique closed file only the web contents (resources) which can be logically described as a service. The web content is not present on the file system but it is reproduced on a virtual file system, supplied for example by the .NET Virtual Path Provider. The advantage of this approach is to have the web application divided into several closed sections logically divided. Thus, the web package can be integrated into a single comprehensive environment as a virtual resource without the requirement to be physically present in the application folder. Moreover, the content of the web package cannot be modified by any ordinary user what is extremely helpful in a distributed environment such as a manufacturing execution system.

When an administrator wants to install a new web package, so far a detection on possible resource name conflicts has to be performed. In particular, the detection is applied on packages that are already installed on the target application but not on all available packages in the virtual repository of the virtual file system.

Currently, web application's content (as web pages, classes, images, and so on) must be identified by a unique name. Unfortunately, it is currently not possible to distribute content with the same name since content with the same name cannot reside in the same web application. In particular, when different developers create content for the same web application, it is most likely that name conflicts occur. The only solution so far known to resolve a name conflict is to rewrite/ rename the code which causes a tremendous effort on re-developing the respective content.

SUMMARY OF THE INVENTION

It is accordingly an object of the invention to provide a method for installing a web package within an manufacturing executing system which overcomes the above-mentioned disadvantages of the prior art methods of this general type, which has a smarter mechanism for name conflict resolution.

The object is achieved according to the present invention by a method for installing a web package within a manufacturing executing system (MES) and the web package contains web application resources. The method includes the steps of: providing a file system by an operation system running the MES; providing a virtual file system within the MES; incorporating a virtual path provider class within the MES in order to implement the virtual file system for Web applications; and running a virtual path provider to supply contents of enable/installed web packages to the virtual file system and building a name structure that maps virtual url with content details before a new web package is going to be installed. For each resource to be processed and comprised in a new web package to be installed, it is checked whether the resource name already exists in the name structure. The resource is installed in case of an absence of a name conflict or applying a prefix for the entire resources of the web package to be installed and storing the name and the prefix to the virtual file system. When a resource is required by a web application, checking in the structure whether the resource exists and in case the resource name contains a prefix, opening the corresponding web package and retrieving the content of the resource by its physical name.

This method enables the administration of resources (content) in web packages. By automatically adding a prefix to the resource name causing the name conflict, even resources having the same name can be handled when installing a new web package by the virtual file system mapping the resources to which a prefix has been added to the physical content required for the web application.

A preferred embodiment of the present invention may provide the virtual file system as a virtual repository containing the name structure mapping a virtual url with web package content details. This repository therefore offers a location service for any resource within the manufacturing execution system environment and in particular for those resources causing name conflicts by automatically making them unique by adding prefix to its name.

Therefore, it is suitable when the web package content details include a physical path, a virtual path and a web package name which enables the unambiguous identification of the resource to be processed.

In order to organize the transfer of the web packages content details in a most promising way, the web package contains an internal predefined structure. The internal structure and the web package content assigned to the internal structure are retrieved by the virtual path provider. The retrieved information is stored then to the virtual file system. The internal predefined structure also assists in the generation of web packages having high integrity and authenticity level.

Accordingly, the virtual path provider reads a virtual repository within the web package and the web contents are stored in the virtual repository. As a further preferred embodiment of the present invention, a user installing a web resource being subject of a name conflict may receive a notification on the involved resource and/or on the prefix added to the involved resource.

Other features which are considered as characteristic for the invention are set forth in the appended claims.

Although the invention is illustrated and described herein as embodied in a method for installing a web package within an manufacturing executing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
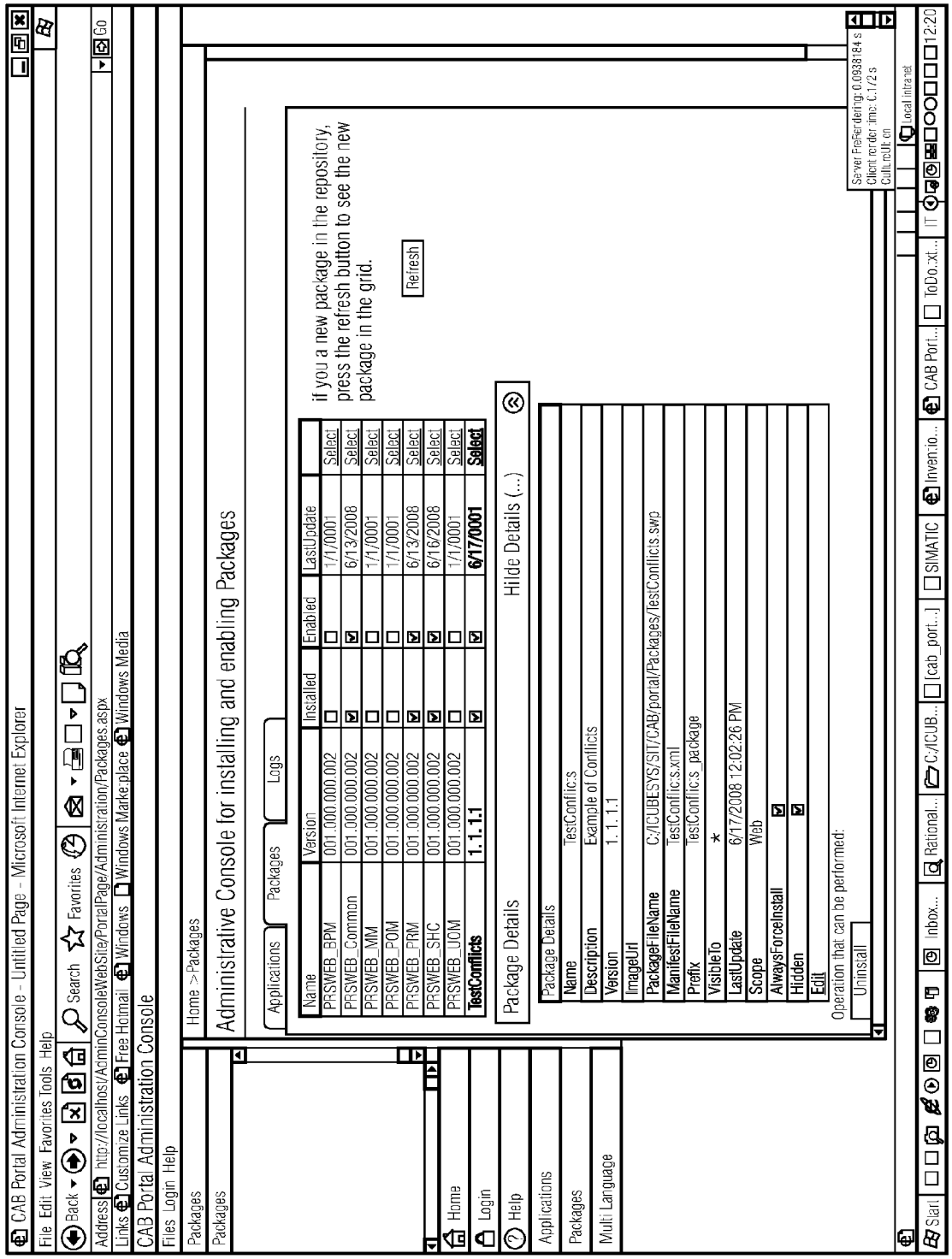
FIG. 1 is a screen-shot of a CAB Portal Administration console when installing a web package.

For the description of the present invention, it has to be emphasized that Microsoft®.NET Framework is the basic software "backbone" for a manufacturing execution system. The Virtual Path Provider class, included in Microsoft.NET Framework 2.0, provides a set of methods for implementing a virtual file system for a Web application. In the virtual file system, the files and directories are managed by a data store other than the file system provided by the operating system of the server. It is possible to store any file (content/resource of a web package) that is processed on request in a virtual file system as:

ASP.NET pages, master pages, user controls, and other objects;
Standard Web pages with extensions such as .htm;
Images (.gif, jpg);
Scripts file (.js);
Theme and skin.

Web packages are therefore a virtual repository in which web contents are stored. A Virtual Path Provider supplies these contents, when required by users, by reading the virtual repository. However, in the prior art the name of the content had stringently to be unique. It was currently not possible to serve different content with the same name.

With the method according to the present invention technique, however, it is now possible to serve different content with the same name (for example, two images with an identical name are stored in two different web packages).

To resolve this problem, the method contains the following steps: before starting installation steps for a new web package, the contents of each enabled/installed web packages are checked, and a name structure is built that maps the virtual url of the web package with contents details, such as its physical path, its virtual path, its package name, etc.

For each resource to be processed and comprised in a new web package, it has to be determined whether a resource with the same name already exists within the name structure; this check is performed before starting installation steps; in case of a name conflict a prefix for the entire resources of the web package is applied and a notification on the involved resources is returned to the user.

When the resource is required by the web application, the method checks into the name structure whether the resource exists: if the answer is yes, the method retrieves information about the resource from the name structure. A resource that caused a name conflict has a prefix and the method there opens the corresponding web packages and retrieves the content/resource by its physical name (of course inside of the web package still kept without the prefix). At this point, the resource is provided by use of the virtual path provider which aligns the virtual path with the physical path to the content to be processed.

It is usual for users in an developing environment to use common names for common objects; for example, "home" or "default" (for the main page of the web site), or "Cancel", "Open", "Delete" for image names for web contents (and not only). This common usage represents the here discussed problem in web applications in which files and/or components with an identical name cannot reside within the same web application. When different developer's users create contents for the same web application, it is very likely that name conflicts occur which had to be manually eliminated by a rename code which nevertheless causes a lot of unproductive developing efforts.

To distribute web contents in easy way, the Virtual Path Provider technique is an appropriate approach but this technique is not enabling the distribution of contents having the same name. The teaching of the present invention facilitates the distribution of web contents in the form of an unique file as a web package without taking care of contents' name (and whether the names are unique or not). If conflicts are detected, the inventive method resolves them by applying a prefix to the package name. For this resolution step any developer efforts are not required. Thus, the main advantage of this solution resides in supplying web content with the same name inside the same web application.

FIG. 1 illustrates schematically a screen-shot of a CAB Portal Administration console within the SIMATIC® IT when installing a web package. To explain in short words the background of SIMATIC® IT, the ISA-95 standard has to be mentioned. ISA-95 is increasingly accepted as the world standard for manufacturing execution systems that customers can rely upon. SIMATIC® IT not only covers ISA-95 functionalities but also actually uses ISA-95 as a blueprint for its product architecture. Siemens Aktiengesellschaft, the owner of SIMATIC® IT, is an active member of the ISA-95 committee to contribute to its continuing development.

SIMATIC® IT itself is a collection of software components representing Siemens' proposition for manufacturing execution systems (MES). SIMATIC IT is uniqueness is represented by its entire architecture, designed using ISA-95 as an architectural blue print for the implementation. SIMATIC® IT Production Modeler enables the definition of the Plant Model and of all the Standard Operating Procedures (in terms of rules) in a fully graphical environment. SIMATIC® IT components physically executes the actions defined in these rules.

SIMATIC® IT Client Application Builder (CAB) which is represented by a screen-shot in FIG. 1, is the native, web-based graphical user interface for building cross-functionality graphic screens. The Client Application Builder (CAB) is fully based on Microsoft® ASP.NET technology.

SIMATIC® IT software solution for the manufacturing execution system, a CAB Portal Administration Console assists the web administrator in displaying available packages information, installing/uninstalling the package in several target CAB Portal applications and managing update of a previously installed package into a new version. FIG. 1 displays in the central window of the screen-shot a list of package details. The prefix is named for this web package "TestConflicts_package". The CAB Portal Administration Console therefore assists the web administrator in displaying available web packages information, installing/uninstalling the package in several target CAB Portal applications and managing update of a previously installed package into a new version.

Figure 2:
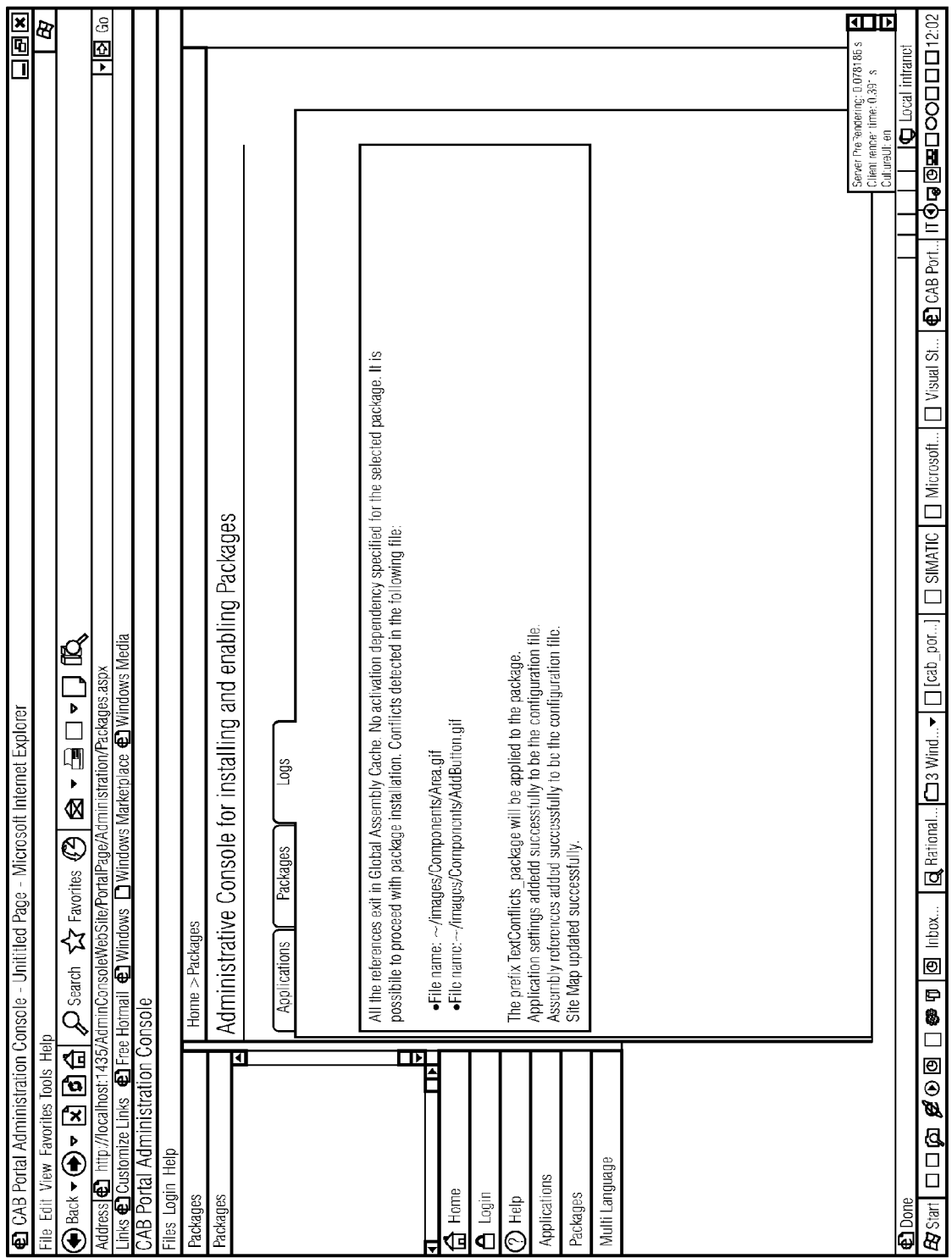
FIG. 2 is a screen-shot of the CAB Portal Administrating console when detecting a name conflict for a web package.

The screen-shot of FIG. 2 illustrates in its central window the measures that have been initiated after a detection of a name conflict. It has been identified during the name checking step that all the references of this web packages already exist in a global virtual file system, here Global Assembly Cache. No activation dependency has been specified for this web package. Therefore, it is possible to proceed with the package installation. Conflicts have been identified for the two files of the package. Therefore, the prefix "TestConflicts_package" will be applied to the web package. Application settings have been successfully added to the configuration file for the web package as well as the assembly references. Finally, the Site Map of the web application installed has been updated successfully. In the virtual file system, entries have been made for the contents of this web package applying the prefix to any content name. The virtual file system also aligns this prefixed entry with the physical path of the resources which has been identified and listed in the central window of FIG. 1. Therefore, the SIMATIC® IT CAB portal administration console contains the mechanism according to the present invention to handle within the same web application content/resources having identical names and being comprised in different web packages.

The invention claimed is:

1. A method for installing a web package within a manufacturing executing system (MES), the web package having web application resources, which comprises the steps of:
   providing a file system via an operation system running the MES;
   providing a virtual file system within the MES;
   incorporating a virtual path provider class within the MES for implementing the virtual file system for Web applications;
   running the virtual path provider to supply contents of enabled/installed web packages to the virtual file system and building a name structure that maps a virtual url with content details before a new web package is going to be installed;
   determining that a resource name already exists in the name structure for each resource to be processed and comprised in the new web package to be installed;
   based on the determination that the resource name already exists, applying a prefix for all resources of the web package to be installed, applying the prefix to a name of the web package to be installed, and storing the prefix to the virtual file system; and
   requiring the resource by a web application, and checking in the name structure whether the resource exists and in case the resource name contains the prefix, opening a corresponding web package and retrieving the content of the resource by its physical name which is kept inside of the web package without the prefix, and providing the resource by using the virtual path provider to align a virtual path with a physical path to the content of the resource.

2. The method according to claim 1, wherein the virtual file system is a virtual repository containing the name structure mapping the virtual url with web package content details.

3. The method according to claim 2, wherein the web package content details contain a physical path, a virtual path and a web package name.

4. The method according to claim 1,
wherein the web package contains an internal predefined structure;
which further comprises retrieving the internal predefined structure and a web package content assigned to the internal predefined structure by the virtual path provider; and
which further comprises storing retrieved information to the virtual file system.

5. The method according to claim 1, wherein the virtual path provider reads a virtual repository within the web package and web contents are stored in the virtual repository.

6. The method according to claim 1, wherein a user installing a web resource being a subject of a name conflict receives a notification on the involved resource.

\* \* \* \* \*